(12) United States Patent
Buschmann et al.

(10) Patent No.: US 9,051,115 B2
(45) Date of Patent: Jun. 9, 2015

(54) FIBRE PRODUCT FOR PACKAGING

(75) Inventors: Armin Buschmann, Hassel (DE); Fulvio Cadonau, Bucken (DE); Ralf Honsbrok, Bucken (DE); Detlev Richter, Morsum (DE); Olaf Truppner, Bucken (DE)

(73) Assignee: Smurfit Kappa Hoya Papier und Karton GmbH, Hoya (DE)

( * ) Notice: Subject to any disclaimer, the term of this patent is extended or adjusted under 35 U.S.C. 154(b) by 0 days.

(21) Appl. No.: 14/128,757

(22) PCT Filed: May 31, 2012

(86) PCT No.: PCT/EP2012/060292
§ 371 (c)(1),
(2), (4) Date: Mar. 24, 2014

(87) PCT Pub. No.: WO2012/175309
PCT Pub. Date: Dec. 27, 2012

(65) Prior Publication Data
US 2014/0231036 A1    Aug. 21, 2014

(30) Foreign Application Priority Data
Jun. 24, 2011  (DE) .......... 10 2011 105 761

(51) Int. Cl.
*D21H 17/67* (2006.01)
*D21H 27/08* (2006.01)
*D21H 27/30* (2006.01)
(Continued)

(52) U.S. Cl.
CPC ............... *B65D 85/72* (2013.01); *D21H 17/67* (2013.01); *D21H 27/30* (2013.01); *D21H 27/08* (2013.01); *D21H 27/007* (2013.01); *B32B 23/00* (2013.01); *B01D 15/08* (2013.01); *D21H 23/04* (2013.01); *D21H 23/24* (2013.01)

(58) Field of Classification Search
CPC ....... D21H 21/22; D21H 21/14; D21H 17/02; D21H 17/67; D21H 23/02; D21H 23/04; D21H 23/22; D21H 23/24; D21H 27/30; D21H 27/32; D21H 27/08; D21H 19/38; D21H 11/14; D21H 27/08; D21H 23/50; D21H 27/007; D21H 3/00; D21H 3/82; D21H 3/825; D21H 5/0005; D21H 5/0047; D21F 11/04; B65H 81/24; B65D 85/72
USPC ......... 162/123, 124, 127, 132, 133, 147, 160, 162/183–186, 181.9, 303
See application file for complete search history.

(56) References Cited

U.S. PATENT DOCUMENTS 3,384,536 A * 5/1968 Sandberg et al. ............. 162/175
4,587,154 A   5/1986 Hotchkiss et al.
(Continued)

FOREIGN PATENT DOCUMENTS

DE  10 2006 34 602   12/2007
DE  10 2006 034 602  12/2007
(Continued)

*Primary Examiner* — Eric Hug
(74) *Attorney, Agent, or Firm* — Honigman Miller Schwartz and Cohn LLP; Thomas A. Wootton; Jonathan P. O'Brien

(57) ABSTRACT

The invention relates to a fibrous product (2, 2.1, 2.2, 2.3) for packaging, in particular food product packaging, comprising at least one first fiber layer (4.1, 4.1', 4.1", 4.2, 4.2', 4.2", 4.3", 4.4", 4.5", 4.6", 14, 16, 18), a filter material (6) for binding mineral oil substances extending at least partly through said first fiber layer (4.1, 4.1', 4.1", 4.2, 4.2', 4.2", 4.3", 4.4", 4.5", 4.6", 14, 16, 18).

20 Claims, 2 Drawing Sheets

(51) Int. Cl.
   *B65D 85/72* (2006.01)
   *D21H 27/00* (2006.01)
   *B32B 23/00* (2006.01)
   *B01D 15/08* (2006.01)
   *D21H 23/04* (2006.01)
   *D21H 23/24* (2006.01)

(56) References Cited

U.S. PATENT DOCUMENTS

| | | |
|---|---|---|
| 5,153,061 A | 10/1992 | Cavagna et al. |
| 6,551,455 B2 * | 4/2003 | Johnson et al. ............... 162/128 |
| 7,320,742 B2 | 1/2008 | O'Neill et al. |
| 2003/0129332 A1 * | 7/2003 | O'Neill et al. ............... 428/34.3 |
| 2004/0087231 A1 | 5/2004 | Nakanishi et al. |
| 2004/0244927 A1 * | 12/2004 | Pianta et al. ................... 162/124 |
| 2010/0092534 A1 | 4/2010 | Rodler et al. |

FOREIGN PATENT DOCUMENTS

| | | | |
|---|---|---|---|
| JP | 1-99951 | * | 4/1989 |
| JP | 10-24967 | * | 1/1998 |
| JP | 2001-32195 | * | 2/2001 |
| JP | 2001-164491 | * | 6/2001 |
| JP | 2006 224 994 | | 8/2006 |
| JP | 2006-224994 | * | 8/2006 |

* cited by examiner

FIBRE PRODUCT FOR PACKAGING

CROSS REFERENCE TO RELATED APPLICATION

This U.S. patent application claims benefit of PCT Application No. PCT/EP/2012/060292, filed on May 31, 2012, which claims the benefit of Germany Application No. DE. 10 2011 105 761.0 filed on Jun. 24, 2011, which is hereby incorporated by reference in its entirety.

The invention relates to a fibre product for packaging, in particular foodstuff packaging, comprising at least a first fibre layer. The invention also relates to a method for producing a fibre product, a device for producing a fibre product and a packaging comprising a fibre product.

Nowadays, a large amount of foodstuff packaging, but also other packaging, is produced from fibre products such as card, cardboard and/or paper. However, fibre products are not only used as packaging, but have a wide field of application. Examples of other products made of fibre products include paper plates, paper cups and the like. Fibre products have at least one fibre layer.

The fibres of a fibre layer may be cellulose fibres/fresh fibres or wastepaper fibres/recycled fibres or a mixture of both types of fibre. A problem encountered with use of recycled fibres is the high proportion of newspaper in wastepaper, newspaper generally being printed with inks containing mineral oils. Indeed, recycled fibres are cleaned and treated before re-use. However, fibre products made of recycled fibres still contain an unavoidable proportion of mineral oil substances. Exemplary fibre products have a concentration of approximately 100 ppm to 500 ppm.

In particular in foodstuff packaging, but also in other products made of fibre materials which come into contact with foodstuffs for example, there is the problem that the mineral oil substances may migrate from the packaging into the foodstuff. The intake of mineral oil substances, such as mineral oil saturated hydrocarbons (MOSHs) and/or mineral oil aromatic hydrocarbons (MOAHs) by a consumer of the foodstuff should be avoided, however, since even the smallest amounts could cause damage to health, for example cancer.

However, this problem occurs not only with recycled fibres, but also with fresh fibres. A large number of individual fresh fibre product packagings may be arranged for transport, for example, in a recycled fibre product packaging. In this case, mineral oil substances from the recycled fibre product packaging may first migrate into the fresh fibre product packaging and then into the foodstuff. Further causes may be waste gases of vehicles, such as waste diesel gases of lorries, or printing inks with which a corresponding packaging is printed.

In order to solve the problem, it is proposed in the prior art to provide the produced fibre product with an additional protective layer in a subsequent processing step. For example, U.S. Pat. No. 5,153,061A discloses a fibre product having a protective layer such as a polymer coating or an aluminium layer. This protective layer is arranged on an inner face of the packaging.

A drawback of this is that a further processing step is necessary after production of the fibre product. This increases the complexity of the production process and, accordingly, the production costs. It is also necessary to apply a protective layer of sufficient thickness over the entire surface in order to prevent migration of mineral oil substances into a further product. However, this protective layer may easily be destroyed and therefore sufficient protection cannot be guaranteed.

The object of the invention is therefore to provide a fibre product which reduces, at least sufficiently, a migration of mineral oil substances from the fibre product into a further product in a reliable and simple manner.

The object is achieved in accordance with the invention with a fibre product according to claim 1.

The fibre product is suitable as a material for packaging, in particular foodstuff packaging. The fibre product comprises at least a first fibre layer. The first fibre layer is interspersed, at least in part, with a filter material to bind mineral oil substances.

In contrast to the prior art, in accordance with the invention a reduction in the migration of mineral oil substances into a further product is not achieved by an additional coating, but instead by filter material introduced into the mass, in other words into the interior of the fibre product.

The fibre product, for example a paper, card and/or cardboard product, comprises at least a first fibre layer. In particular, a fibre layer comprises suitable fibres.

In accordance with the invention it has been found that an interspersion of the fibre layer with a filter material, which can bind or absorb mineral oil substances at least, causes a significant reduction in a simple manner of the migration of mineral oil substances into a product which is in contact, at least temporarily, with the fibre product. In particular, interspersion means that the fibre layer provided (in any case) comprises the filter material in addition to the fibres. In other words, the filter material is arranged inside the at least one fibre layer or inside the fibre product. In this case even a partial or uniform interspersion may lead to a sufficient repression of migration.

An additional protective layer and an additional coating step after production of the fibre product may be omitted.

In the fibre product according to the invention the migration can be reduced in particular to a value of at least less than 0.6 g/kg by a (partial) interspersion of a fibre layer with filter material. A fibre product can preferably be provided in which the migration is reduced to a value of at least less than 0.1 g/kg. The measured values can be determined using different measuring methods. For example, by chemical analysis. Simulants may be used to establish the amount of migrated substances. These simulants have comparable properties to the product to be packaged. The simulants are examined for migrated constituents after a fixed reaction time (10 days) under precisely defined conditions, such as temperature (40° C.).

In accordance with a first embodiment of the fibre product according to the invention the first fibre layer may comprise recycled fibres. Alternatively or additionally, the first fibre layer may comprise fresh fibres. Recycled fibres, also known as wastepaper fibres, can be produced from waste paper. It is understood that the recycled fibres can be cleaned. The cleaning of the recycled fibres reduces the mineral oil content, but not to a sufficient extent. Only the addition of filter material according to the invention ensures that the migration of mineral oil substances can be sufficiently reduced, in particular below 0.1 g/kg.

For example, fresh fibres are fibres made of cellulose. Depending on the application of the fibre product and/or depending on desired properties of the at least one fibre layer, the first fibre layer may comprise exclusively fresh fibres, exclusively recycled fibres or both types of fibres at a pre-definable ratio.

In accordance with a further preferred embodiment the filter material may be an activated carbon. It has been found that activated carbon is particularly suitable as filter material. For example, the activated carbon may be provided in particle form. The (mean) diameter of the activated carbon particles may be in the range of 1 μm and 100 μm. Activated carbon particles can be easily interspersed in a fibre layer. At the same time, an undesired escape of the activated carbon from a fibre layer can be prevented (optionally by additives). Furthermore, activated carbon can bind mineral oil substances practically permanently, at least during the service life of a fibre product. It is understood in particular that the activated carbon may be an activated carbon which is suitable for foodstuffs.

As already described, in principle a large number of filter materials may be used, provided the filter material can bind mineral oil substances. Activated carbon can preferably be used. It has been found that particularly low migration values can be obtained if the activated carbon is formed, at least in part, of a vegetable material. The vegetable material may preferably comprise coconut shells. Such an activated carbon has particularly good mineral oil absorbing properties.

In addition, in accordance with a further embodiment of the fibre product according to the invention at least one further layer which is connected to the first fibre layer may be provided. In particular, card or cardboard products generally have a plurality of layers. A plurality of layers may increase the stability and load-bearing capacity of the fibre product. For example, the at least one further layer may be a further fibre layer. For example, card or cardboard products may comprise three or more fibre layers. The outer fibre layers may preferably be optimised in terms of strength, whilst inner fibre layers may be optimised in terms of volume.

Furthermore, the at least one further layer may be a protective layer. A protective layer in particular in the form of a coating is a layer which forms a barrier in order to at least reduce the migration of undesired substances into a neighbouring product. For example, a plastic coating and/or a metal coating may be provided. Reliability can be further improved by an additional protective layer. Although the introduction of filter material into the fibre product is, in principle, sufficient to almost completely prevent a migration of mineral oil substances into a further product, an additional protective layer may advantageously be provided. For example, if a production fault occurs and for example the fibre product is not interspersed with filter material, the fibre product can in any case be used further owing to the additional protective layer.

In principle, the protective layer can be arranged in any position of the fibre product. A simple and particularly efficient embodiment is provided if at least one cover layer of the fibre product is a protective layer. In particular a lower cover layer, that is to say the layer which comes into contact with the product to be packaged, may be formed as a protective layer. As has already been described, the protective layer may comprise suitable plastic and/or metal materials which at least reduce the amount of migrating mineral oil substances from the fibre product. The protective layer may advantageously additionally be formed in such a way that an escape of filter material from a fibre layer can also be prevented.

The upper cover layer, which is suitable in particular for printing, may alternatively or additionally be formed as a protective layer. The migration of mineral oil substances into the fibre product, for example from another fibre product, can at least be reduced. At least one inner layer of the fibre product may advantageously be a fibre layer. For example, a plurality of fibre layers may be provided between a lower cover layer, such as a suitable protective coating, and an upper cover layer, such as a suitable protective coating. A fibre product having improved migration properties and sufficient stability can be provided.

A further aspect of the invention is a method for producing a fibre product, in particular a fibre product as described above. The method includes the following steps:
producing at least a first fibre layer from a fibre suspension, and
adding a filter material to bind mineral oil substances in such a way that the first fibre layer is interspersed, at least in part, with the filter material.

In contrast to the prior art, a coating for protection against an undesired migration of mineral oil substances is not subsequently applied to the produced and dried fibre product, but instead a filter material is added in such a way that at least one fibre layer is interspersed, at least in part.

A fibre suspension may be provided in order to produce a fibre layer. A fibre suspension comprises at least fibres, such as recycled and/or fresh fibres, and water. It is understood that further additives and/or fillers can be added. The exact composition of the fibre suspension may depend, in particular, on the desired properties of the fibre layer.

It has been found that, during the production of the fibre product, that is to say during the wet phase, filter material can be added so that the filter material can be accumulated or deposited, at least in part, within the at least one fibre layer. A fibre product can be produced in a simple manner in which a migration of mineral oil substances into a further product can be reduced, at least considerably, without the need for an additional coating of the fibre product.

In principle, the filter material can be added at any moment, provided at least one fibre layer can be interspersed, at least in part, with the filter material. In accordance with a first embodiment of the method according to the invention the filter material can be added to the fibre suspension. The filter material can be added to and mixed with the fibre suspension at a predefinable ratio. The fibre layer produced from this fibre suspension can thus be interspersed with filter material (virtually uniformly) in a simple manner.

Alternatively or additionally, the filter material can be applied to the produced first fibre layer. It is understood that the filter material can be applied during the wet phase to the produced first fibre layer. It has been found that the filter material can penetrate easily into the fibre layer at this stage and can be deposited there. Basically, the filter material penetrates into preferably 50%, in particular 70%. The filter material can be prevented from escaping again from the fibre layer.

As has already been described, the filter material may preferably be added during the wet phase. This process is preferably carried out at a temperature of 30° C. to 50° C., in particular at 35° C. to 45° C. Even in this temperature range, the fibre layer behaves in such a way that a filter material can easily penetrate and deposit there. In particular it has been found that the filter material remains better bonded in the fibre layer in this temperature range.

In a preferred embodiment of the method a binder may be applied to the produced first fibre layer. In particular a binder connects, for example adheres, further layers to the first fibre layer. The binder may preferably comprise the filter material. The filter material and the binder may form a mixture at a predefinable ratio so that the filter material and the binder can be applied together. A joint application affords the advantage that the binder also binds the filter material and an escape of the filter material from the at least one fibre layer is prevented. Furthermore, an application of a binder is generally provided in any case, and therefore a conventional method can be modified in a simple manner.

In accordance with one embodiment the binder can be sprayed onto the produced first fibre layer. This enables a maximally uniform and precise application of the binder and of the filter material over the surface of the produced first fibre layer. Starch may preferably be used as a binder. It is understood that other binders can also be used.

As has already been described, the filter material may preferably be an activated carbon. Furthermore, different filter materials can be used at the same time.

In accordance with a further embodiment of the method, at least one further layer can be applied to the first fibre layer provided with the binder. The first fibre layer can be pressed together with the further layer. The two layers can be (permanently) connected by the binder, which may comprise the filter material.

In particular, the further layer may be a further fibre layer or a protective layer. If a further fibre layer is provided, the filter material may also intersperse the further fibre layer, at least in part. In particular, this may be assisted by the pressing process. As a result of the pressing process, a force can be exerted onto the filter material in such a way that the filter material, such as activated carbon particles, is pressed into the further layer, where it is deposited.

It is understood that the further filter layer can be produced similarly to the first fibre layer. Furthermore, the fibre layers are preferably connected during the wet phase.

A further aspect of the invention is a device for producing a fibre product, in particular a fibre product as described above. The device comprises a first feed unit for applying a fibre suspension to a dewatering unit. The dewatering unit is provided to produce a first fibre layer. The device comprises at least one further feed unit for applying at least one filter material to the first fibre layer in such a way that the produced first fibre layer is interspersed by the filter material, at least in part.

The device according to the invention makes it possible, in a simple manner, to introduce a filter material into the mass of the fibre product. In particular, the device is adapted to carry out the method described above.

The first feed unit is configured to apply a first fibre suspension to a dewatering unit. For example, the first feed unit may comprise a container for receiving the suspension and an outlet unit, such as a nozzle or the like. The feed unit may preferably form a thin jet which is as uniform as possible. A uniform fibre layer can be produced.

For example, the dewatering unit may be a conveyor belt, wherein the conveyor belt may comprise openings so that water can drain away, but the fibres cannot. For example, a screen-like conveyor belt may be provided.

At least one further feed unit, for example a spraying device, may be provided. The conveyor belt with the produced fibre layer may be conveyed past the further feed unit. This affords the advantage that a fibre layer has already formed when the filter material is applied. However, the fibre layer has not dried out and therefore filter material can be introduced in a simple manner into the produced fibre layer, and the fibre layer can thus be interspersed, at least in part, by the filter material. The further feed unit may preferably be configured to apply a mixture comprising filter material and binder.

In accordance with one embodiment of the device according to the invention at least one pressing unit for connecting at least a further layer to the first fibre layer may be provided. The pressing unit, for example a roller unit having one or more rollers may be configured, in particular, to press together two fibre layers to be connected. For example, a pressure couch roll or a similar apparatus may be provided, It is understood that three or more layers, in particular fibre and/or protective layers, may also be pressed simultaneously in a roller unit.

Yet a further aspect of the invention is a packaging, in particular a foodstuff packaging, which comprises the fibre product described above. In particular, the packaging may be formed, at least in part but preferably completely, of a fibre product as described above. A migration of mineral oil substances into the packaged material, such as a foodstuff, can be reduced, at least significantly.

There are now a large number of possibilities for designing and developing the fibre product according to the invention, the method according to the invention for producing a fibre product, the device according to the invention for producing a fibre product, and the packaging according to the invention. Reference is made in this regard to the claims which are subordinate to the independent claims, and to the description of embodiments in conjunction with the drawings, in which:

Hereinafter, like reference numerals will be used for like elements.

Figure 1:
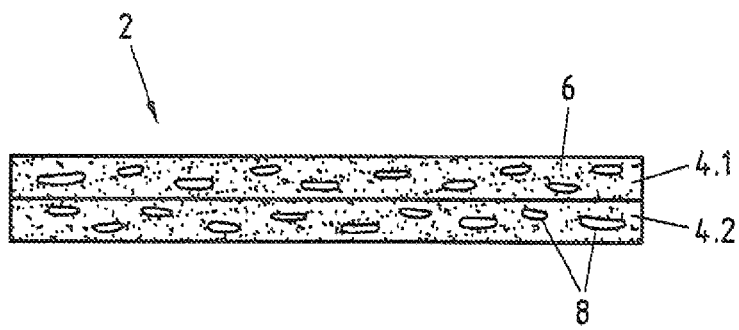
FIG. 1 is a schematic view of a first embodiment of a fibre product according to the present invention.

FIG. 1 shows a simplified view of a first embodiment of a fibre product 2 according to the present invention. The fibre product 2 illustrated, in particular a paper, card and/or cardboard product, comprises two layers 4.1 and 4.2. In the present embodiment the layers 4.1 and 4.2 are formed as a first fibre layer 4.1 and a further fibre layer 4.2.

A fibre layer 4.1, 4.2 comprises fibres 8. For example, a fibre layer 4.1, 4.2 may comprise recycled fibres 8 and/or fresh fibres 8. Fresh fibres 8, also known as primary fibres, are used for the first time to produce a fibre product 2. Exemplary fibre materials for fresh fibres are groundwood pulp, semi-chemical pulp or cellulose. Recycled fibres 8, also known as secondary fibres, can be obtained from waste paper in particular.

Furthermore, the illustrated fibre product 2 comprises a filter material 6 to bind mineral oil substances. The filter material 6, preferably an activated carbon 6, may be provided in particular in at least one fibre layer 4.1, 4.2 and may be interspersed therein, at least in part. In particular, the filter material 6 is adapted to absorb mineral oil substances. The filter material 6 is preferably adapted to reduce the migration of these substances by the binding of mineral oil substances.

For example, a fibre product 2 may be provided which comprises a filter material 6 and which has a migration value of at least less than 0.6 mg/kg, preferably of at least less than 0.1 mg/kg. The migration value is the amount (in mg) which migrates within 10 days at 40° C. into one kg of foodstuff.

In particular, mineral oil substances such as mineral oil saturated hydrocarbons (MOSHs) and/or mineral oil aromatic hydrocarbons (MOAHs) may be bonded to the filter material 6.

As has already been described, activated carbon 6 may preferably be used as filter material 6. Activated carbon 6 formed of vegetable raw materials, such as coconut shells, is particularly preferred.

In a preferred embodiment the activated carbon 6 may be provided in granular form. The grinding fineness may be approximately 80%, for example approximately 45 μm. The water content when packing the activated carbon 6 may preferably be 10% at most, in particular 7%. The ash content may be 3% at most, preferably 1%. Acidic fractions of the activated carbon may be 3% at most, preferably 0.8%. In addition, the water-soluble fraction may be 0.2% at most, in particular 0.05%. The pH value of the activated carbon 6 may be between 5 and 7, and may preferably be 6.5. Furthermore, the minimum iodine number may be 900 mg/g, in particular 950 mg/g. The specific surface area (BET) of the activated carbon particles may be approximately 1000 m$^2$/g.

The filter material 6 may be distributed (practically) uniformly in the two fibre layers 4.1, 4.2. In principle, a partial interspersion at least of one fibre layer 4.1, 4.2 is also sufficient. The proportion of the filter material 6 in an inner region of the fibre product 2 may preferably be greater than on the outer surface in order to prevent the filter material being able to escape from the fibre product 2.

It is understood that a fibre product 2 may contain further materials. For example, gluing and impregnating materials such as animal glues, resins, etc., fillers such as kaolin, talc, etc. and/or additives such as dyes, wetting agents, etc. may be provided.

Figure 2:
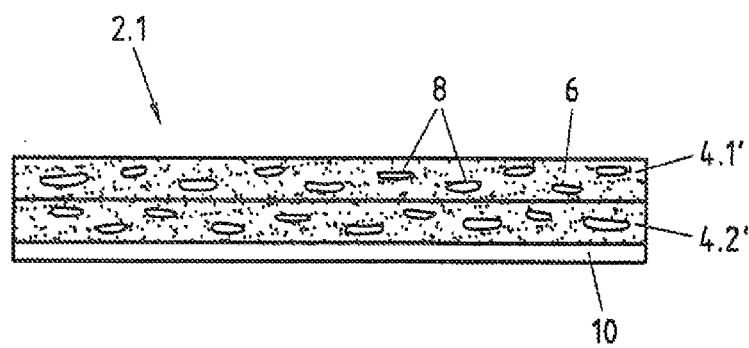
FIG. 2 is a schematic view of a further embodiment of a fibre product according to the present invention.

FIG. 2 shows a further simplified view of a further embodiment of a fibre product 2.1 according to the present invention. Compared to the fibre product 2 according to FIG. 1, the fibre product 2.1 according to FIG. 2 comprises two fibre layers 4.1' and 4.2' and a protective layer 10.

In particular, the protective layer 10 forms a cover layer or top layer. The protective layer 10 may preferably form at least the inner cover layer, that is to say the cover layer which contacts a medium to be received. In the case of foodstuff packaging, the protective layer 10 is therefore arranged on an inner face of the packaging.

For example, the protective layer 10 may be a plastic material coating. Alternatively or in addition, suitable metal foils may be provided. A protective layer 10 may further reduce the risk of an undesired migration of mineral oil substances. In addition, the protective layer 10 may be formed in such a way that the filter material 6 can be prevented from escaping.

Figure 3:
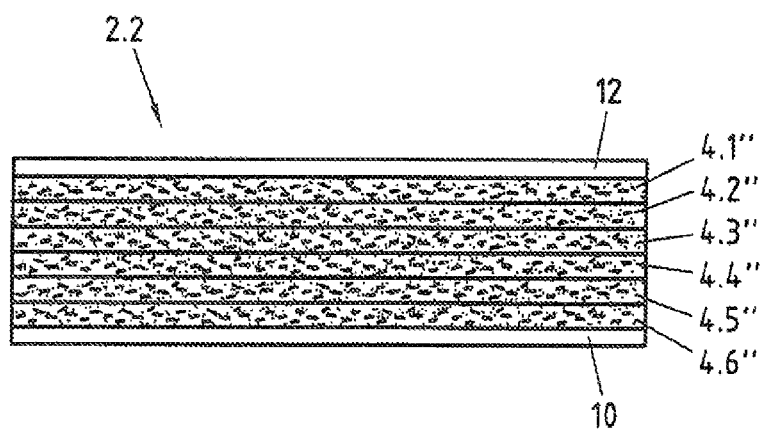
FIG. 3 is a schematic view of a further embodiment of a fibre product according to the present invention.

A further simplified view of a further embodiment of a fibre product 2.2 is illustrated in FIG. 3. The fibre product 2.2 shown comprises an upper cover layer 12, a lower cover layer 10 and six inner layers 4.1" to 4.6".

The upper cover layer 12 may be the outer layer of a packaging. The upper cover layer 12 can be printed. Furthermore, the cover layer 12 may be formed as a protective coating 12 in order to prevent penetration of mineral oil substances into the fibre product 2.2. As has been already described, the lower cover layer 10 may be formed as a protective coating 10.

In particular, the layers 4.1" to 4.6" may be formed as fibre layers 4.1" to 4.6" which can be interspersed, at least in part, with a filter material.

It is understood that any number of fibre layers 4 can be provided. It is also understood that (all) fibre layers 4 can be formed differently or can be formed identically, at least in part. For example, the fibre layers 4.1" and 4.6" may be optimised in terms of stability, whilst the fibre layers 4.2" to 4.5" may be optimised in terms of volume.

In accordance with other variations of the invention, nine inner fibre layers 4 may be provided with an upper coating 12 and a lower protective layer 10.

Figure 4:
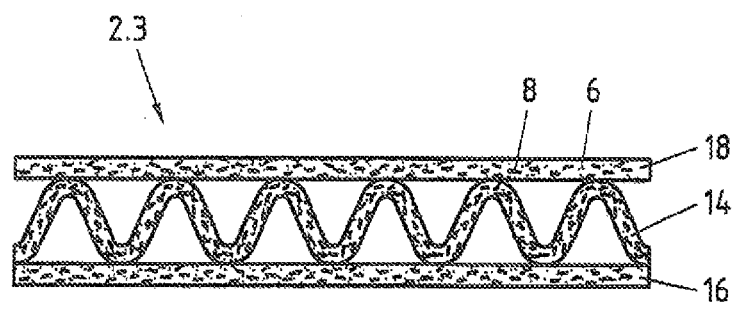
FIG. 4 is a schematic view of a further embodiment of a fibre product according to the present invention.

FIG. 4 shows a further embodiment of a fibre product 2.3 according to the present invention. In particular, the embodiment illustrated is a single-layer corrugated board 2.3 with an undulating middle layer 14 and an upper cover layer 18 and a lower cover layer 16. These fibre layers 14 to 18 can be interspersed, at least in part, with a filter material. It is understood that double- or multi-layer corrugated board products and/or different flute types, such as B-flutes, C-flutes, F-flutes, etc. can also be provided in accordance with other variations of the invention.

Figure 5:
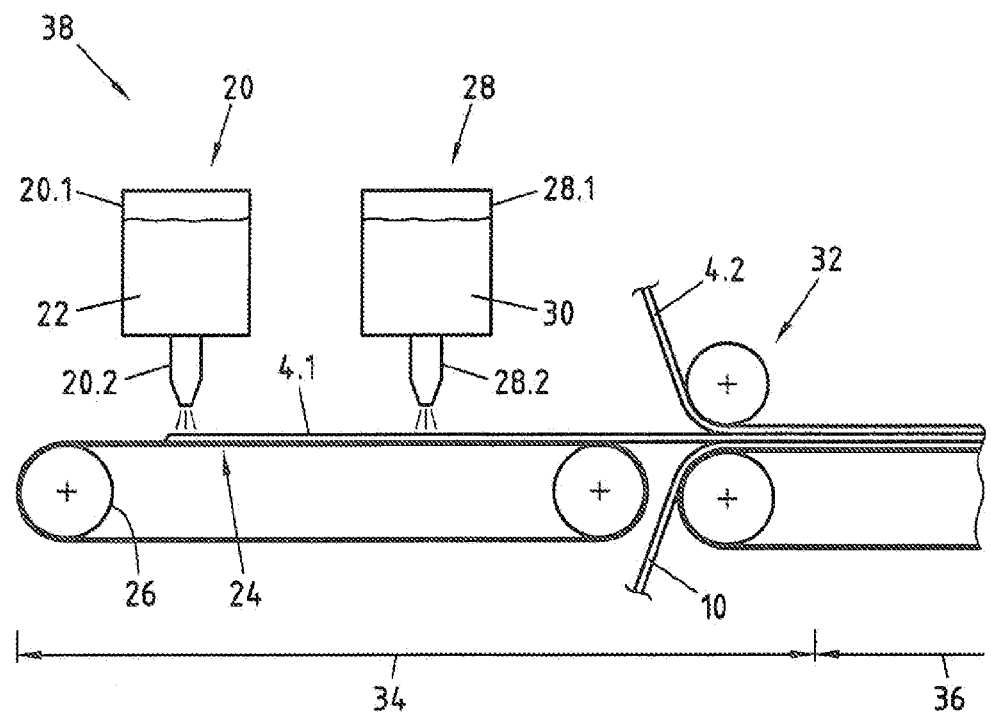
FIG. 5 is a schematic view of an embodiment of a device for producing a fibre product.

FIG. 5 shows a simplified view of an embodiment of a device 38 for producing a fibre product 2, 2.1, 2.2 or 2.3. In particular, the device 38 may be a paper, card or cardboard machine.

The device 38 illustrated comprises a first feed unit 20 for applying a fibre suspension 22 to a dewatering unit 24. The feed unit 20, for example a headbox, may comprise a storage container 20.1 and a nozzle unit 20.2. For example, a thin and uniform jet can be formed.

For example, the dewatering unit 24 may be a screen 24 which can rotate by means of rollers 26. The fibre suspension 22 applied to the screen 24 may consist of approximately 99% water and 1% fibres. A very large amount of the water can drain away within a few seconds. The fibre structure of the first fibre layer 4.1 can be produced.

In addition, a further feed unit 28 is provided in the present embodiment. The further feed unit 28 may be configured at least to apply the filter material 6 to the first fibre layer 4.1. In particular, the further feed unit 28 may comprise a storage container 28.1 and a nozzle unit 28.2. A binder 30 which comprises the filter material 6 may preferably be stored in the storage container 28.1. The binder 30, for example starch, may be provided in particular to connect a second fibre layer 4.2 to the first fibre layer 4.1. The filter material 6 may be introduced particularly easily into the fibre product 2 if it is applied together with the binder 30. The binder 30 comprising the filter material 6 may preferably be sprayed on using the nozzle means 28.1. It is understood that other feed unit may also be provided.

As can also be seen in FIG. 5, the device 38 illustrated further comprises a pressing unit 32 in the form of a roller unit 32. The roller unit 32 may be a pressure couch roll in particular. In the present case, two fibre layers 4.1, 4.2 may be (undetachably) connected to one another by the pressure couch roll. Furthermore, a further layer 10 such as a protective layer 10 can be applied at the same time using the pressing unit 32 illustrated. It is understood that the layers 4.2, 10 can also be applied sequentially in accordance with other variations of the invention.

In particular it is understood that, in accordance with other variations of the invention, the device 38 for producing the fibre product 2 may comprise further components in order to produce multi-layer fibre products 2 for example. Coating unit for producing an upper and a lower cover layer 10, 12 may preferably be provided. The device 38 may be divided into a wet part 34 and a subsequent dry part 36. Once the fibre product 2 has been produced and in particular once at least one fibre layer 4.1, 4.2 has been interspersed with a filter material 6 in the wet part 34, the produced fibre product 2 may pass through a drying unit.

Figure 6:
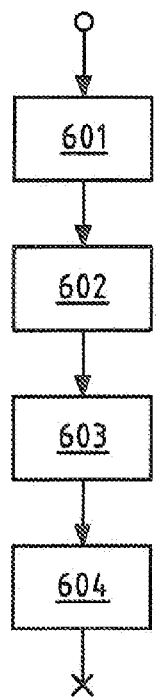
FIG. 6 is a flow diagram of an embodiment of a method for producing a fibre product.

The operating principle of the device 38 according to FIG. 5 will be explained hereinafter in detail with the aid of FIG. 6. FIG. 6 shows a flow diagram of an embodiment of a method for producing a fibre product 2, in particular by means of the device 38 according to FIG. 5.

In a first step 601 a fibre suspension 22 can be applied to a dewatering unit 24 using a first feed means 20. A large part of the water can drain away by the dewatering means 24. A first fibre layer 4.1 is formed.

It is understood that the suspension 22 can initially be produced in a prior step. Different methods for processing the raw materials are known.

In a next step 602 at least the filter material 6 can be applied, preferably together with a binder 30. In particular, a corresponding mixture 30 can be applied to the formed first fibre layer 4.1 by means of a further feed unit 28. As has already been described, the binder 30 is used in particular as an adhesive to connect the first fibre layer 4.1 to a further fibre layer 4.2. The filter material particles 6 can penetrate, at least in part, into the first fibre layer 4.1 and become interspersed therein. For example, the filter material particles 6 can penetrate into at least 50%, preferably 70% and in particular 100% and be deposited therein.

It is understood that, in accordance with other variations of the invention, the filter material 6 may already be added to the fibre suspension 22.

The fibre layer 4.1 interspersed at least with filter material 6 can be connected in a further step 603 to a further fibre layer 4.2 and to an additional protective layer 10. In particular, the layers 4.1, 4.2 and 10 can be interconnected using a pressing unit 32. Since the layers 4.1, 4.2 and 10 are connected in the wet phase 34, the filter material 6 can also be interspersed, at least in part, within the further fibre layer 4.2. The layers 4.1, 4.2 and 10 may also be connected sequentially in a number of sub-steps.

It is understood that further layers are formed in the wet phase and can be connected in a similar manner to the laminar structure. For example, a binder mixed with filter material can again be applied to the further fibre layer 4.2. Yet a further fibre layer can then be applied to the further fibre layer 4.2. Once a plurality of fibre layers has been applied and preferably each interspersed with a filter material, an upper cover layer can be applied.

In a final step 604 the produced fibre product 2 can be dried in a drying phase. It is understood that further processing steps, such as a cutting to size of the fibre product, a printing of the fibre product, etc. can be carried out.

The invention claimed is:

1. A fiber product for foodstuff packaging, comprising at least one first fiber layer, wherein the first fiber layer comprises cellulose fibers and the fiber product is card, board or paper, wherein the first fiber layer is at least partially interspersed with a filter material for binding mineral oil substances in such a manner that the fiber product has a migration value of at least less than 0.6 mg/kg., wherein said filter material is comprised of activated charcoal.

2. The fiber product according to claim 1, wherein the activated charcoal is at least partially formed from a vegetable material.

3. The fiber product according to claim 2 wherein the activated charcoal is at least partially formed from coconut husks.

4. The fiber product according to claim 1, wherein at least one further layer connected to the first fiber layer is provided.

5. The fiber product according to claim 4, wherein the further layer is another fiber layer or the further layer is a protective layer.

6. A method for producing a fiber product, which is a foodstuff packaging product, comprising the formation of at least one first fiber layer containing a filter material, wherein the fibers of said first fiber layer are made from cellulose fibers and said fiber product is shaped into the form of a card, a board or a paper, wherein said first fiber layer is then interspersed with said filter material for binding mineral oil substances in such a manner that the fiber product with interspersed filter material has a migration value of at least less than 0.6 mg/kg. of mineral oil, wherein said filter material is comprised of activated charcoal, wherein said fiber product is made from a fiber suspension, wherein said suspension is comprised of the first fiber layer interspersed at least in part with activated charcoal.

7. The method according to claim 6 wherein said filter material contains both activated charcoal and a binder; said binder is sprayed onto the first fiber layer, wherein the binder comprises the filter material.

8. The method according to claim 7, wherein the binder comprises starch and the filter material is an activated charcoal wherein said activated charcoal is comprised of carbon particles having a mean diameter from about 1 μm to about 100 μm.

9. The method according to claim 7, wherein at least one further layer is applied to the first fiber layer provided with the binder, wherein the first fiber layer is pressed with the further fiber layer or layers.

10. A method of reducing the migration of mineral oil substances from a foodstuff in a fiber based foodstuff package, wherein the migration value of the mineral oil substances from said foodstuff is about 0.6 mg/kg or less of mineral oil substances migrating from said foodstuff; comprising interspersing activated carbon filter material into a fiber product, wherein said fiber product interspersed with filter material is in the form of card, board, paper or any combination of card, board, and paper.

11. A method of claim 10 wherein said activated carbon is comprised of carbon particles having a mean diameter from about 1 μm to about 100 μm.

12. The method of claim 11, wherein the activated charcoal is at least partially formed from a vegetable material.

13. The method of claim 12, wherein the vegetable material is from coconut husks and the migration of mineral oil substances is reduced to below 0.1 g/kg.

14. The method of claim 10 wherein at least one further layer connected to the first fiber layer is provided.

15. The method of claim 14 wherein said further layer is either a second, third or fourth fiber layer optionally interspersed with activated carbon or any of the second, third or fourth layer may be a protective layer.

16. The method of claim 12, wherein the vegetable material is from coconut husks.

17. A method for binding mineral oil substances in foodstuff packaging wherein the migration value of mineral oil from the foodstuff in said packaging is reduced to at least less than 0.6 mg/kg, comprising interspersing activated carbon particles, in the size range of 1 μm to 100 μm, into a cellulose fiber layer or layers wherein said cellulose fiber layer or layers with interspersed carbon particles are formed into a card or board.

18. The method of claim 17, wherein the activated charcoal is at least partially formed from a vegetable material.

19. The method of claim 17 wherein at least one further layer connected to the first fiber layer is provided.

20. The method of claim 19 wherein said further layer is either a second, third or fourth fiber layer optionally interspersed with activated carbon or any of the second, third or fourth layer may be a protective layer, and the migration of mineral oil substances is reduced to below about 0.1 g/kg.

* * * * *